June 14, 1938.          J. G. BINGHAM                 2,120,691
                    PRESSURE INDICATING DEVICE
                       Filed July 12, 1935
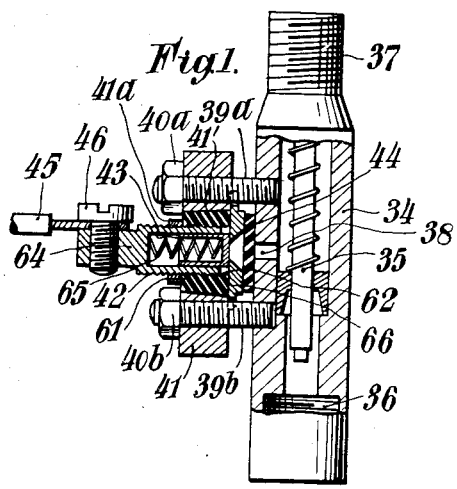
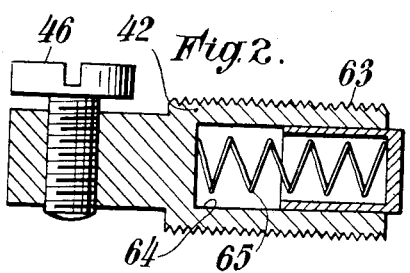
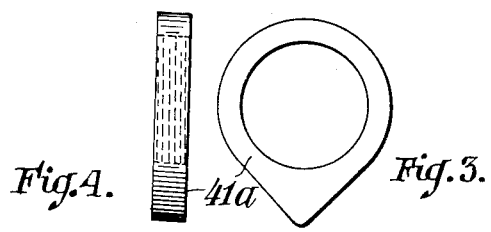
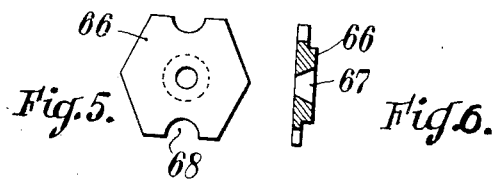
JOHN GILBERT BINGHAM, Inventor Patented June 14, 1938

2,120,691

UNITED STATES PATENT OFFICE 2,120,691

PRESSURE INDICATING DEVICE

John Gilbert Bingham, Bexhill-on-Sea, England, assignor of one-third to Charles Ellis Bingham and one-third to Louise Bingham Application July 12, 1935, Serial No. 31,076
In Great Britain July 23, 1934

4 Claims. (Cl. 200—58)

This invention relates to pressure indicating devices and is very suitable for indicating the air pressure in pneumatic tires.

The object of the invention is to indicate when the pressure passes a predetermined value.

In accordance with this invention I provide in fluid pressure electrically operated switch apparatus for indicating a variation in fluid pressure at a valve, a device permanently externally attachable directly to an integral standard valve stem and provided with a rubber diaphragm member covering a lateral orifice in said stem open to the fluid pressure to be indicated and leaving the normal fluid path through the valve stem uninterrupted, securing means for attaching said device to said stem, means whereby said diaphragm is constrained to change its shape on alteration in the fluid pressure, an electric switch forming an integral part of the device and attached to said securing means, spring means operable without dismounting the valve for setting the switch so that at the desired fluid pressure said flexible diaphragm opens said switch, by assuming a predetermined shape, the switch and valve stem acting as a current conductor.

The accompanying drawing illustrates one form of device made in accordance with this invention as applied to a pneumatic tire pressure indicator.

Fig. 1 is a sectional elevation of the valve;

Fig. 2 is an enlarged sectional elevation of the plunger and its casing;

Fig. 3 is a front elevation of the locking ring;

Fig. 4 is a side elevation thereof;

Fig. 5 is an elevation of the plate or washer, and

Fig. 6 is a vertical section thereof.

The device comprises a valve stem 34 containing a valve 35 of the kind known as Schrader. The stem 34 is bored and tapped at one end 36 to fit a standard tire valve and at the other end 37 to fit a tire pump. In the side of the stem 34 a small hole 38 is provided (preferably about $\frac{1}{32}$ to $\frac{1}{16}$ of an inch in diameter). Fastened to the stem 34 by two $\frac{1}{8}''$ studs 39a, 39b, and nuts 40a, 40b, is a switch carrier 41 for a switch casing 42 provided with a plunger 43. The carrier 41 holds in position a rubber pad 44 covering orifice 38 to make the casing air tight. An insulated wire 45 is fastened to the switch casing 42 by a locking screw 46, the other end of the insulated wire being secured to an insulated band on a brake drum or to another element in circuit with an electric light on the dashboard of the car so as to indicate, when the circuit is completed, the reduction of air pressure in the particular tire of the car to which the valve 34 is attached.

The switch carrier 41 is provided with a tapered orifice 41' in which is disposed an ebonite insulating tube 61 which is internally threaded at 62 to engage with corresponding threads 63 cut on the exterior of the plunger casing 42. The plunger casing is screwed almost but not quite home in the ebonite tube and is held in position by the locking ring 41a. Within the casing recess 64 is slidably disposed the plunger 43. Between casing and plunger is placed a coiled spring 65, which normally presses the plunger 43 against a metal washer 66, so as to close the conical countersunk orifice 67 in said washer. In order to retain the washer 66 properly in position it is laterally orificed at 68 for the accommodation of screws 39a and 39b which act as guides for the washer. The washer presses on the rubber pad 44 and holds it in position against the side of the valve stem 34 so as to close orifice 38 as before stated.

In use the valve in the tire is taken out and the stem 34 is screwed to the valve casing of the tire and the tire is inflated in the usual manner. The pressure in the tire and stem 34 forces out the rubber pad 44 and causes a swelling which lifts the plunger 43 and breaks the electrical contact between the plunger 43 and the washer 66. After the tire is inflated to the required pressure the casing 42 is turned as to produce the compression on the spring 65, which will allow the plunger 43 to be lifted off the washer 66 by the swelling of the rubber pad 44.

The thread adjustment of the casing 42 in the insulation tube 61 should be fine and be so adjusted as just to break the contact between the plunger 43 and the washer 66.

If by puncture of the tire or other means the pressure in the tire falls causing a corresponding fall of pressure in the chamber of valve stem 34, which lessens the swelling in the rubber pad 44, thereby allowing the plunger 43 to fall and come in contact with the washer 66, this completes the electric circuit and lights the appropriate light on the dashboard.

It will be evident that besides indicating the drop in pressure the device may be so employed that on inflation it will indicate when the correct pressure has again been reached.

It will be evident that the details of the invention may be varied in many ways without departing from the scope thereof.

What I claim and desire to secure by Letters Patent is:—

1. In fluid pressure electrically operated switch apparatus for indicating a variation in fluid pressure at a valve, a device externally attachable directly to an integral straight valve stem, comprising a body portion, a rubber diaphragm placed over a lateral orifice in said stem open to fluid pressure to be indicated, an orificed plate placed between the diaphragm and said body, securing means for attaching said parts to the valve stem, a casing provided with an internal bore and externally threaded, means for securing an electric conductor to said casing, a spring-pressed plunger sliding within the bore of said casing and normally pressed over the orifice of said plate, and insulating means between said body and said casing, said casing being threaded to said insulating means and adjustable by rotation for setting the switch so that at the desired fluid pressure the diaphragm by transmitting pressure from the valve casing to said plunger breaks the circuit, the switch and valve stem acting as a current conductor.

2. In a fluid pressure electrically operated switch apparatus for indicating a variation in fluid pressure at a valve, comprising a valve, a casing having an orifice in a lateral wall thereof, in combination with a device to be permanently attached to said casing, and comprising a rubber diaphragm placed over the orifice in said stem, an orificed plate of conducting material over said diaphragm, a body member, means for clamping the body member against said plate to in turn press said diaphragm against the valve casing over said orifice, studs in threaded engagement with said valve stem, nuts engaging said studs and serving to clamp the body, orificed plate, and diaphragm to the valve stem, an externally threaded casing having a central bore, an insulating member between said body and casing and having threaded engagement with the latter, a plunger sliding in the bore of said casing, spring means for normally forcing said plunger outward against the orificed plate, electrical means connected with said casing, said plunger constituting a switch and functioning with the casing as a conductor, the spring acting to hold said plunger in contact with the orificed plate to close a circuit upon reduction of tire pressure below normal, said diaphragm under normal pressure being distorted and acting to convey pressure to the plunger for opening the circuit.

3. In fluid pressure electrically operated switch apparatus for indicating a variation in fluid pressure at a valve, comprising a valve having a stem provided with a lateral aperture, a device externally attachable directly to said stem and comprising a body, an orificed plate, a rubber diaphragm covering the lateral orifice in the valve stem and open to the fluid pressure from within said stem which is to be indicated, leaving free the normal fluid path through said stem, securing means for attaching said body, diaphragm, and plate to said stem, a movable switch element comprising a plunger, a casing having a bore to receive said plunger slidably therein, a spring for forcing said plunger against said orificed plate, an insulated tube firmly fixed to the body, said casing threaded into said tube, said plunger forming the contact means of the switch when forced by said spring into engagement with the orificed plate, and being operated by pressure transmitted through said diaphragm for unseating said plunger when the tire pressure is sufficient to overcome the spring pressure back of the plunger, said casing being rotatable for setting the switch to close when said diaphragm assumes a predetermined shape, the switch constituted by the plunger and its casing acting as a current conductor.

4 In a fluid pressure electrically operated switch apparatus for indicating a variation in fluid pressure, a valve stem having a lateral orifice, a device externally attachable directly to said valve stem, said device including a body, a rubber diaphragm covering said orifice and exposed to the fluid pressure to be indicated and leaving free the normal fluid path through the valve casing, means for attaching said diaphragm to said stem, an orificed plate clamped over said diaphragm by said means, said plate being shaped to permit the diaphragm to change its shape on alteration in the fluid pressure, electric switch means comprising a spring-controlled plunger, a casing in which said plunger is slidably disposed, an insulated tube firmly fixed into said body and in threaded engagement with said casing, said plunger forming the movable contact member of the switch and being operated directly by pressure from said diaphragm, said casing being rotatable for adjusting the point at which the switch is to open the circuit when said diaphragm assumes a predetermined shape, the switch and valve stem acting as a current conductor, and means for locking said casing in its adjusted position.

JOHN GILBERT BINGHAM.